Oct. 27, 1936.                J. O. BETTERTON                2,058,947
COPPER REFINING
Filed Aug. 17, 1933
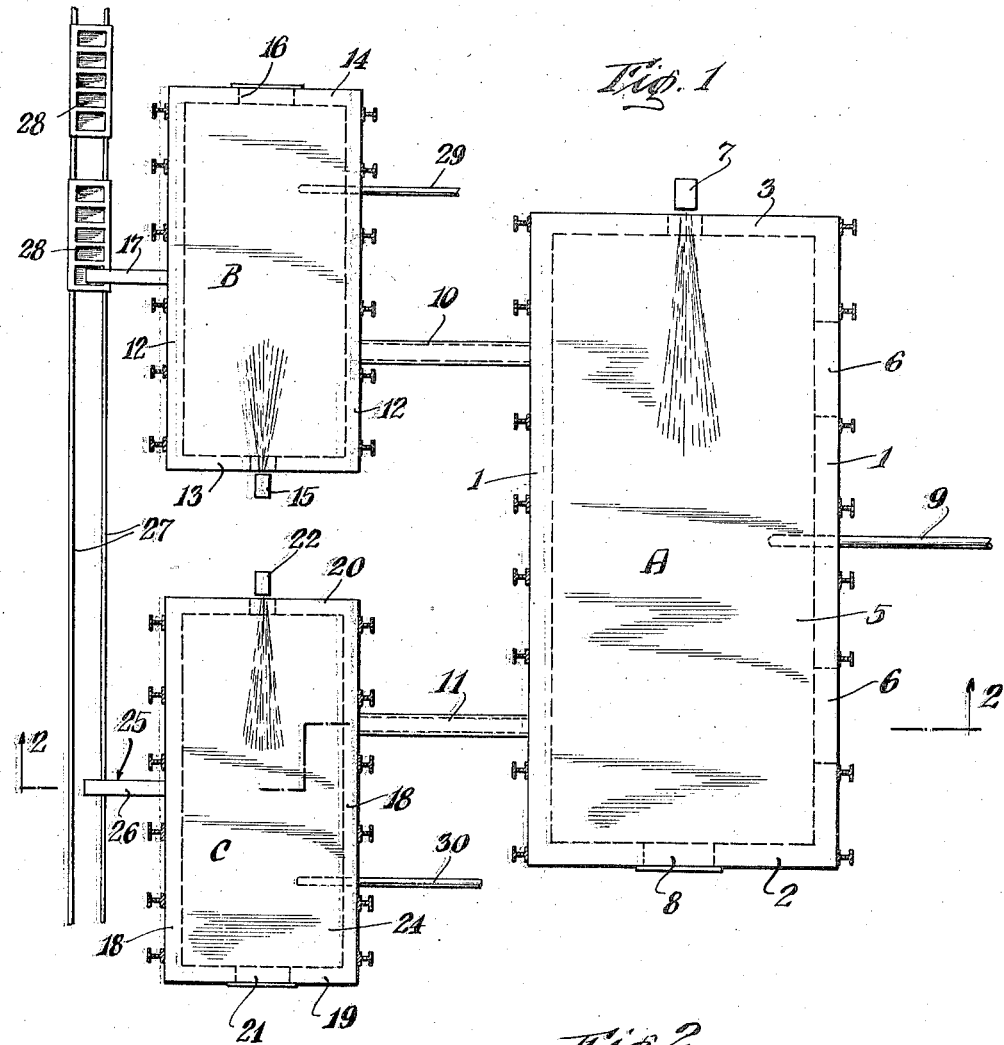
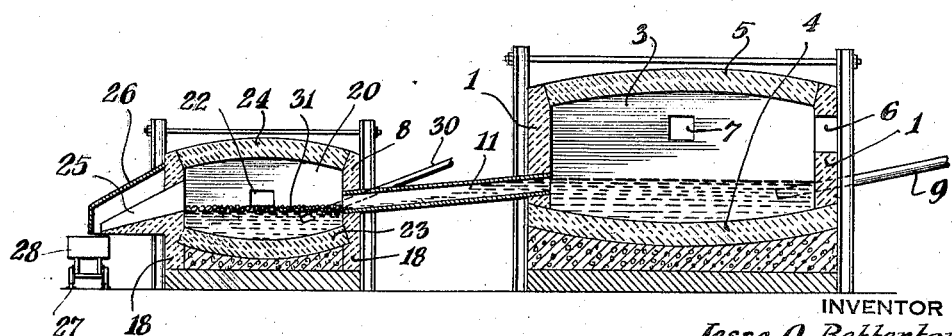
INVENTOR
Jesse O. Betterton
BY
Austin & Dix
ATTORNEYS Patented Oct. 27, 1936

2,058,947

UNITED STATES PATENT OFFICE 2,058,947

COPPER REFINING

Jesse O. Betterton, Metuchen, N. J., assignor to American Smelting and Refining Company, New York, N. Y., a corporation of New Jersey Application August 17, 1933, Serial No. 685,587

7 Claims. (Cl. 75—76)

This invention relates to the refining of copper.

Among other features, the invention provides an improved, continuous process of melting, refining and casting copper to yield commercially sound castings which are oxygen-free as determined by microscopic examination.

In accordance with the invention, copper, for example copper cathodes or scrap copper, is melted down and oxidized with air to eliminate sulphur, absorbed gases, iron and other impurities present. Thereafter, the copper is agitated under a carbonaceous cover with a neutral or non-absorbable gas, that is, a gas or mixture of gases which will serve to "pole" the copper, but will not contaminate it. When deoxidized to the desired degree, the copper is cast, care being taken to prevent oxidation of the metal during the casting operation.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a diagrammatic plan view of apparatus for practicing the invention; and Fig. 2 is a cross-section along the line 2—2 of Fig. 1.

Like reference characters denote like parts in the several figures of the drawing.

In the following description and in the claims, various details will be identified by specific names for convenience, but they are intended to be as generic in their application as the art will permit.

Referring now to the drawing, an operating unit is shown consisting of furnaces, a melting and oxidizing furnace A and refining furnaces B and C. Furnace A comprising side walls 1, end walls 2 and 3, hearth 4 and roof 5 is provided with charging doors 6, burners 7, inspection door 8 and air pipe 9. Furnaces B and C are connected with furnace A via covered tapping spouts and launders 10 and 11 respectively. Furnace B is shown with side walls 12 and end walls 13 and 14, in which are provided respectively burner 15 and inspection door 16. Tapping spout 17 is also provided. Furnace C is shown comprising side walls 18, end walls 19 and 20, in which inspection door 21 and burner 22 are respectively provided, hearth 23 and roof 24. Tapping spout 25 in furnace C and tapping spout 17 in furnace B are provided with gas tight hoods as shown by 26 in furnace C in Fig. 2. Track 27 carries molds 28 to either tapping spout 17 or 25. Pipes 29 and 30 are adapted for introducing gas into the furnaces B and C below the surface of the metal.

In producing commercially sound, oxygen-free copper castings, the invention may be practised as follows: copper cathodes, scrap copper or the like is charged to furnace A through doors 6 and melted by means of heat supplied from burners 7. The molten bath is oxidized to remove sulphur, absorbed gases, iron and the like by injecting air through pipe 9. The oxidized copper may then be tapped to furnace B or C where it is agitated by means of non-absorbable gases injected into the body of the bath through pipe 29 or pipe 30, the molten copper being covered with a layer of carbonaceous material, as indicated by 31. When the copper is deoxidized or "poled" to the degree desired, it is cast into molds 28. As previously described, the tapping spouts are covered with gas tight hoods to prevent contamination during casting. Ordinarily, no additional heat need be supplied the charge in the refining furnaces B and C as the deoxidation reactions are sufficiently exothermic to maintain the metal in the desired molten state. If necessary, however, heat may be supplied by the combustion of dry coke or pre-ignited charcoal through burners 15 and 22, thereby supplying to the furnace the heat lost by radiation therefrom, so that the charge may be completely deoxidized without over-poling the copper.

By operating a plurality of furnaces as shown a continuous process is provided, the furnaces B and C being used alternatively for refining and casting and the furnace A being used continuously for melting and oxidizing the impurities from the charge.

Several gases or mixtures thereof are available for agitating the metal to deoxidize same, it only being necessary to use gases which will not be absorbed by the copper or introduce contaminants therein. Excellent results are obtainable by utilizing a gas mixture which is readily produced by passing air (previously dried, as, for example, by silica gel, activated alumina, refrigeration, chemical driers or the like) through hot coke or heat treated charcoal thereby yielding a gas relatively high in carbon monoxide and nitrogen and low in water and hydrogen. If desired, however, any of carbon monoxide, nitrogen, carbon dioxide or mixtures thereof may be used if free of water vapor and hydrogen. Again, the non-absorbable gas selected should be desulphurized to remove carbon bisulphide or hydrogen sulphide before it is introduced into the refining or "poling" furnace.

In deoxidizing the copper, sufficient coke or charcoal should be used to insure a surplus over that required to react with the copper oxide removed from the bath by agitation with the non-absorbable gases. In this manner the water and hydrocarbons of the coke or charcoal are eliminated, while the metal is still relatively high in oxygen and not so susceptible to absorption of hydrogen. If desired, coke which has been previously dried or charcoal which has been partially burned, say, 20%, or heated to a red heat in a non-combustible atmosphere may be used with excellent results. It has also been found highly desirable to fill in the interstices in the coke or charcoal cover after deoxidation with soda ash, fused caustic soda or other fluid slags to insure a gas tight cover.

In order to further decrease the opportunities for contamination, I prefer to build the hearth of the funaces of low iron magnesite brick. Similarly, I have found that by providing pipes formed from high melting point alloys instead of wrought iron to introduce the gases into the furnaces contamination with iron is greatly reduced.

It will thus be appreciated that the present invention offers many advantages over the ordinary furnace methods for poling copper. By the invention "over poling", a common fault with the ordinary deoxation practice when green poles are utilized and which necessitates reoxidation and repoling, is eliminated. Again, the invention makes for ease in controlling the refining process as copper may be brought to tough pitch or rendered entirely oxygen-free readily and efficiently as desired. Other advantages will be readily apparent to those skilled in the art.

While certain novel features of the invention have been disclosed and are pointed out in the annexed claims, it will be understood that various omissions, substitutions and changes may be made by those skilled in the art without departing from the spirit of the invention.

What is claimed is:

1. A continuous process for treating copper which consists of melting and oxidizing copper cathodes in a melting furnace to eliminate sulphur, absorbed gases and other impurities, deoxidizing the copper in a second furnace by agitation with non-absorbable gases under cover of a layer of carbonaceous material while supplying heat by burning dry coke above said layer and casting oxygen-free copper from said second furnace.

2. A continuous process for treating copper which comprises melting and oxidizing copper cathodes in a melting furnace to eliminate sulphur, absorbed gases and other impurities, deoxidizing the copper in a second furnace by agitaton with nonabsorbable gases under cover of a layer of carbonaceous material while burning dry fuel above the said layer, the said fuel being free from hydrogen and hydrogen compounds, and casting oxygen-free copper from said second furnace.

3. A continuous process for treating copper which comprises melting and oxidizing copper cathodes in a melting furnace to eliminate sulphur, absorbed gases and other impurities, deoxidizing the copper in a second furnace by agitation with non-absorbable gases under cover of carbonaceous material while burning dry carbonaceous fuel above the said layer selected from the group consisting of dry coke and pre-ignited charcoal, the said fuel being free from hydrogen and its compounds, and casting oxygen-free copper from said second furnace.

4. The method of producing oxygen-free copper, which comprises covering a molten bath of previously oxidized copper with a layer of carbonaceous material, agitating the bath by blowing non-absorbable gases therethrough until deoxidation of the bath is effected by the reducing action of the carbonaceous material, supplying the heat lost by radiation from the furnace by injecting into the furnace dry air and a fuel free from hydrogen and its compounds, maintaining a seal of molten flux on the layer of carbonaceous material, and burning the said fuel above the said layer of carbonaceous material, thereby completely deoxidizing the copper without overpoling the same.

5. The method of producing oxygen-free copper, which comprises covering a molten bath of previously oxidized copper with a layer of carbonaceous material, agitating the bath by blowing non-absorbable gases therethrough until deoxidation of the bath is effected by the reducing action of the carbonaceous material, adding a soda-ash flux to the layer of carbonaceous material, supplying the heat lost by radiation from the furnace by injecting into the furnace dry air and a fuel free from hydrogen and its compounds, and burning the said fuel above the said layer of carbonaceous material while maintaining a seal of the soda-ash flux on the said layer, thereby completely deoxidizing the copper without overpoling the same.

6. The method of producing oxygen-free copper, which comprises covering a molten bath of previously oxidized copper with a layer of carbonaceous material, agitating the bath by blowing non-absorbable gases therethrough until deoxidation of the bath is effected by the reducing action of the carbonaceous material, supplying the heat lost by radiation from the furnace by injecting air and a fuel into the furnace, and burning the said fuel above the said layer of carbonaceous material while maintaining combustion products of the fuel out of contact with the copper, thereby completely deoxidizing the copper without overpoling the same.

7. The method of producing oxygen-free copper, which comprises covering a molten bath of previously oxidized copper with a layer of carbonaceous material, agitating the bath by blowing non-absorbable gases therethrough until deoxidation of the bath is effected by the reducing action of the carbonaceous material, there being maintained sufficient carbonaceous material in the layer to insure a surplus over that required to react with the copper oxide removed from the bath by agitation with the non-absorbable gases, thereby eliminating water and hydrocarbons from the carbonaceous material while the copper is still relatively high in oxygen, supplying the heat lost by radiation from the furnace by injecting into the furnace substantially dry air and a fuel substantially free from hydrogen and its compounds, and burning the said fuel above the said layer of carbonaceous material while maintaining the copper out of contact with the combustion products of the fuel, thereby completely deoxidizing the copper without overpoling the same.

JESSE O. BETTERTON.